E. T. FRAIM.
Assignor of one-half to M. W. FRAIM.
PADLOCK.
No. 10,272. Reissued Jan. 16, 1883.
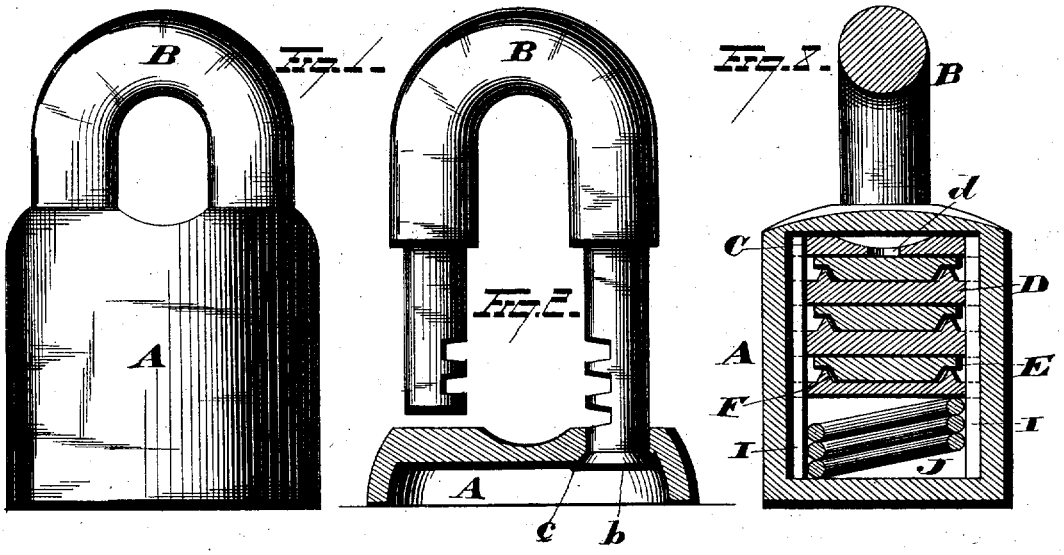
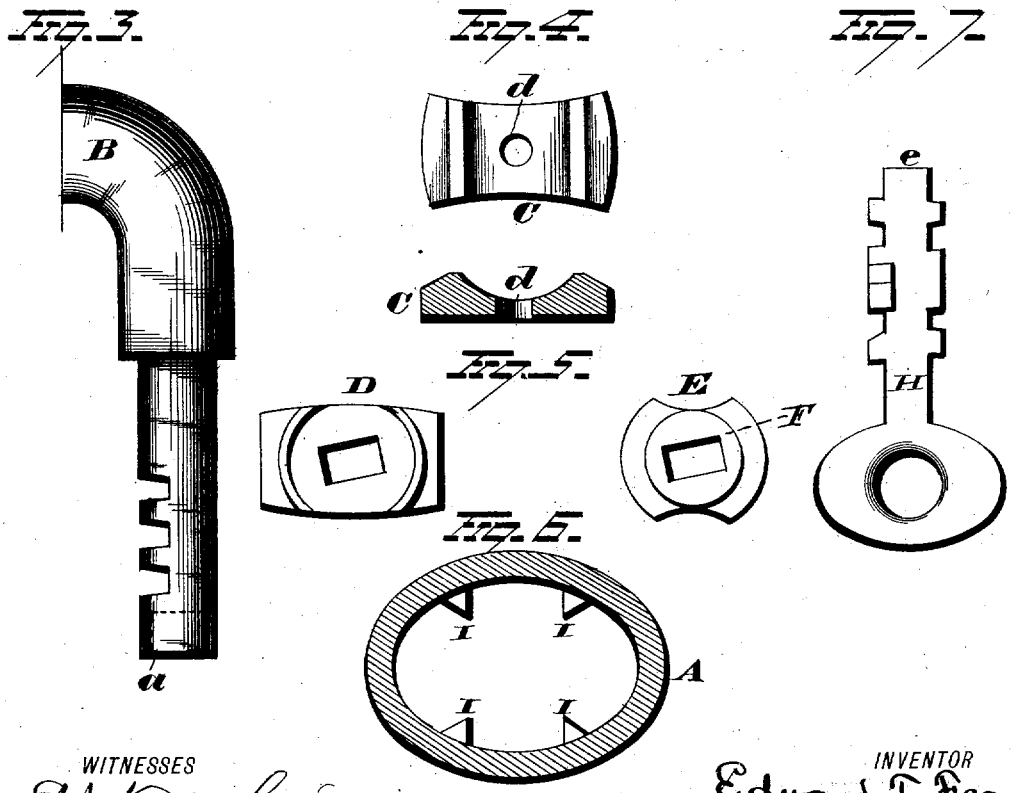
WITNESSES
E. A. Nottingham,
George F. Downing
INVENTOR
Edward T. Fraim
By H. A. Seymour,
Attorney
N. PETERS, Photo-Lithographer, Washington, D. C.

UNITED STATES PATENT OFFICE.

EDWARD T. FRAIM, OF LANCASTER, PENNSYLVANIA, ASSIGNOR OF ONE-HALF TO MILLER W. FRAIM, OF SAME PLACE.

PADLOCK.

SPECIFICATION forming part of Reissued Letters Patent No. 10,272, dated January 16, 1883.

Original No. 240,586, dated April 26, 1881. Application for reissue filed June 28, 1882.

*To all whom it may concern:*

Be it known that I, EDWARD T. FRAIM, a citizen of the United States, residing at Lancaster and State of Pennsylvania, have invented certain new and useful Improvements in Padlocks, of which the following is the specification.

My invention relates to improvements in that class of padlocks in which a U-shaped hasp or shackle with notches cut in both arms thereof is held in the case by means of a number of tumblers resting upon stationary plates, the whole series of which are held together by means of a spiral spring resting on the bottom plate of the case; and the objects of my improvements are, first, to steady the upper end of the key in the case while turning the tumblers, and, second, to prevent the shifting of the tumblers from their places on the stationary plates.

In the accompanying drawings, which illustrate the application of my improvement, Figure 1 is a side view of my improved lock. Fig. 2 is a vertical sectional view of the upper portion of the lock-casing, showing the manner of securing one arm of the shackle secured thereto. Fig. 3 shows the "fast" arm of the shackle before it is secured in position. Fig. 4 is a plan view and a view in vertical section of the plate placed in the upper part of the case for holding the key in position while operating the lock. Fig. 5 represents respectively a plan view of the stationary plates for holding the tumbler in position and a reverse plan view of one of the tumblers; and Fig. 6 is a horizontal sectional view of the lock-case. Fig. 7 is a view of the key of the lock, and Fig. 8 is a vertical transverse sectional view of the lock with all the parts of the mechanism in place.

The fast arm of the shackle B is provided with a circular opening, *a*, in the end thereof, and after it is introduced into the lock A the metal surrounding the said opening *a* is forced apart, so as to form a circular flange, *b*, which fits in the countersink *c* in the case A and prevents the complete withdrawal of the shackle after the same has been released by the tumblers.

On the inside of the lock-case A, and cast as part of the same, are four vertical ribs, I, adapted to hold such plates as are to remain immovably in place, the said plates being placed in the case between the ribs I. The first put in the case is the stationary plate C, which latter is provided centrally with a small opening, *d*, into which the small upper end, *e*, of the key H rests when the latter is introduced into the lock. The lower face of this plate C is smooth, so as to form a bearing-surface for the tumbler which rests up against the same, while the upper surface thereof is concaved, preferably, so as to present but a slight bearing-surface against the top of the case, and thereby avoids the effects of the irregularities in the casting of the inner top surface of the case by resting against it as little of the surface of the plate as possible.

The locking mechanism consists of stationary plates D and movable tumblers E. Heretofore these stationary plates D were made with smooth flat surfaces which form the bearings for the adjacent tumblers, thus permitting lateral displacement of said tumblers by jarring of the lock. When such displacement occurs the lock is rendered useless, and must be taken apart for repair. To prevent these tumblers E from being shifted from their proper positions relative to the stationary plates, I provide the said stationary plates with curved ribs, guides, or raised portions concentric with the plates, so as to form a central circular bearing or recess, in which the hub or disks F of the tumblers E rest and turn. These circular ribs hold the tumblers against side or lateral displacement and form bearings in which they turn.

In placing the mechanism in the lock-case the key-holding plate is first placed in position with its smooth face toward the lower face of the lock-case. A tumbler is next placed in position with its smooth face against the stationary plate and its opposite or hub face toward the lower face of the lock-case. A stationary plate is next introduced with its rib-face toward the hub-face of the tumbler, and so on until the entire lot of plates and tumblers have been placed in position. The spring is next placed in position, and all the interior parts are finally secured by the lower face-plate of the case, which is secured in position last.

The stationary plates and tumblers are alternately arranged as shown in the accompanying drawings, and are each provided centrally with an opening for the passage of the key.

The tumblers are nearly circular in form, and are provided on opposite sides with cut-away portions, which, when turned so as to rest opposite the arms of the shackle, allow the latter to be drawn upward out of the case. When it is desired to lock the shackle the key is introduced in the lock and passed inward until the upper end thereof enters the opening *d*. It is then turned until the convexed edges of the tumblers enter the notches in the shackle, which holds the parts firmly in position and retains them until the key, which is especially adapted for the lock and the peculiar construction and position of the tumblers, is again introduced.

Any suitable number of stationary plates and tumblers can be employed, and they are held in their proper relative positions by the spring I, which latter bears respectively against the lower stationary plate and the inner face of the lower face-plate of the lock-case. This latter plate is secured in position after all the interior working parts of the lock are introduced.

I am aware that a permutation-lock has been patented in which the rotary tumblers are provided with shoulders, annular washers being interposed between the adjacent tumblers, the inner peripheries of said washers engaging the shoulders on the tumblers, and their outer peripheries engaging the inner surface of the case, and hence I would have it understood that I make no claim to such construction and arrangement of parts.

In my improvement every alternate plate is secured within the case in a stationary manner, and is provided with a central opening for the passage of the key. The stationary plates are provided on one side with curved guides or flanges, forming bearings for the rotary tumblers, the latter being of less diameter than the case, so as to freely turn therein, and by means of said flanges or guides are kept from lateral displacement. By means of the key the central openings in the rotary tumblers may be made to register with those in the stationary plates.

Having fully described my invention, what I claim as new, and desire to secure by Letters Patent, is—

1. The top plate, forming the upper tumbler-bearing, and provided with an opening arranged to form a bearing for the end of the key, substantially as and for the purpose set forth.

2. A plate removably secured in the upper portion of the lock-case, and provided with a central opening for the reception of the end of the key for the purpose of steadying the same, the lower face of the said plate being smooth, so as to form a bearing-surface for the tumbler situated below the same, while the upper face thereof is adapted to have a limited bearing against the inner top of the case, for the purpose set forth.

3. The combination, with the case and the series of removable plates secured in a stationary manner within the case, said stationary plates being provided with key-holes and curved guides or flanges encircling the key-holes, of the rotary tumblers provided with key-holes adapted to be turned to register with those in the stationary plates, and constructed to fit within the curved guides or flanges on the latter, the staple, and a removable key, substantially as set forth.

Witness my hand this 5th day of June, A. D. 1882.

EDWARD T. FRAIM.

Witnesses:
H. CLAY DRUCKEMILLER,
AMANDIS STETLER.